United States Patent [19]
Hawbaker

[11] Patent Number: 5,156,108
[45] Date of Patent: Oct. 20, 1992

[54] MILKING PARLOR CONSTRUCTION

[76] Inventor: Clifford L. Hawbaker, 2300 Edenville Rd., Chambersburg, Pa. 17201

[21] Appl. No.: 835,838

[22] Filed: Feb. 14, 1992

[51] Int. Cl.$^5$ .............................................. A01J 3/00
[52] U.S. Cl. ................................................. 119/14.03
[58] Field of Search .......... 119/14.01, 14.03, 15, 119/27, 16

[56] References Cited

U.S. PATENT DOCUMENTS

| | | | |
|---|---|---|---|
| 2,969,039 | 1/1961 | Golay | 119/14.03 |
| 3,301,215 | 1/1967 | Shakarian | 119/14.03 |
| 4,194,467 | 3/1980 | Nielsen et al. | 119/14.03 |
| 4,508,059 | 4/1985 | Anderson | 119/14.03 |

Primary Examiner—Gene Mancene
Assistant Examiner—Thomas Price
Attorney, Agent, or Firm—Daniel J. O'Connor

[57] ABSTRACT

A cow milking parlor construction which utilizes an adjustable brisket rail system and method to speed entry and exit of cows in a milking parlor environment. The method steps described result in a simpler construction which may be readily manufactured and economically installed into new or existing milking parlor operations. Milking parlor efficiency is increased without requiring the complex mechanical components of the prior art.

1 Claim, 1 Drawing Sheet

MILKING PARLOR CONSTRUCTION

BACKGROUND AND OBJECTS OF THE INVENTION

This invention is generally related to the milking parlor arts and, in particular, to the novel use of a brisket rail in such arts.

Prior art systems in the dairy industry have attempted to provide for a more rapid exit of dairy cows from the milking barn so that the parlor can be used more efficiently. Little work has been done to speed up the entry of cows.

In addition to speeding the milking operation, it has also been deemed desirable in the art to reduce labor costs by creating a system which requires less manpower requirements in the dairy operation.

It has also been realized in the art that any system which is to be widely commercially accepted must be one which can be easily installed into existing milking barn operations.

Prior art systems which have attempted to address the above requirements have proven to be overly complex and costly as to preclude their widespread commercial acceptance.

In addition to being costly to use and install, prior art milking parlor systems have not solved the problem of preventing injury to the cows during the milking operation.

Accordingly, it is an object of the present invention to demonstrate a novel milking parlor construction which effects rapid cow entry and exit to improve efficiency of the milking parlor operation.

It is a further object of the invention to demonstrate a milking parlor construction which may be readily installed into existing milking barn operations.

It is a still further object of the invention to disclose a novel milking parlor construction which may be economically manufactured and used for widespread commercial acceptance.

It is also an object of the invention to demonstrate a system which utilizes an adjustable brisket rail method as a means to efficiently funnel cows into and out of the milking area.

These and other objects and advantages of the present system will be apparent to those of skill in the art from the description which follows.

PRIOR ART PATENTS

During the course of preparing this application for submission to the U.S. Patent and Trademark Office, a full search of the milking barn and milking parlor arts was conducted.

The most relevant prior art found in the patent search is listed as follows:

U.S. Pat. No. 3,885,528 issued to Vadenberg in 1975 for a "Rapid Exit Milking Barn".

U.S. Pat. No. 4,419,961 issued to Vandenberg et al in 1983 for a "Milking Parlor Construction".

U.S. Pat. No. 4,508,059 issued to Anderson in 1985 for a "Milking Barn".

The above patented systems at least partially address the problem of rapid cow egress.

However, the complexity and cost of such prior art systems has resulted in their not being used on a widespread commercial basis.

In contrast, the present invention may be readily installed and used by herdsmen in the milking industry and is thus expected to be of highly significant commercial use and appeal.

Furthermore, the method concepts disclosed herein are novel in the art and are believed to be clearly patentable over all known prior art systems.

SUMMARY OF THE INVENTION

The invention comprises moving a brisket rail into various efficient positions for the milking operation.

The three primary positions are as follows:

1. An inlet funneling position shown as line 42 in FIG. 2,
2. A milking position shown as line 43 in FIG. 2,
3. An egress reverse funneling position shown as line 45 in FIG. 2.

Two other brisket rail positions are also possible, as indicated at lines 41 and 44 of FIG. 2, and are deemed a further aspect of the invention.

BRIEF DESCRIPTION OF THE DRAWING FIGURES

FULL DESCRIPTION OF THE PREFERRED EMBODIMENT

Figure 1:
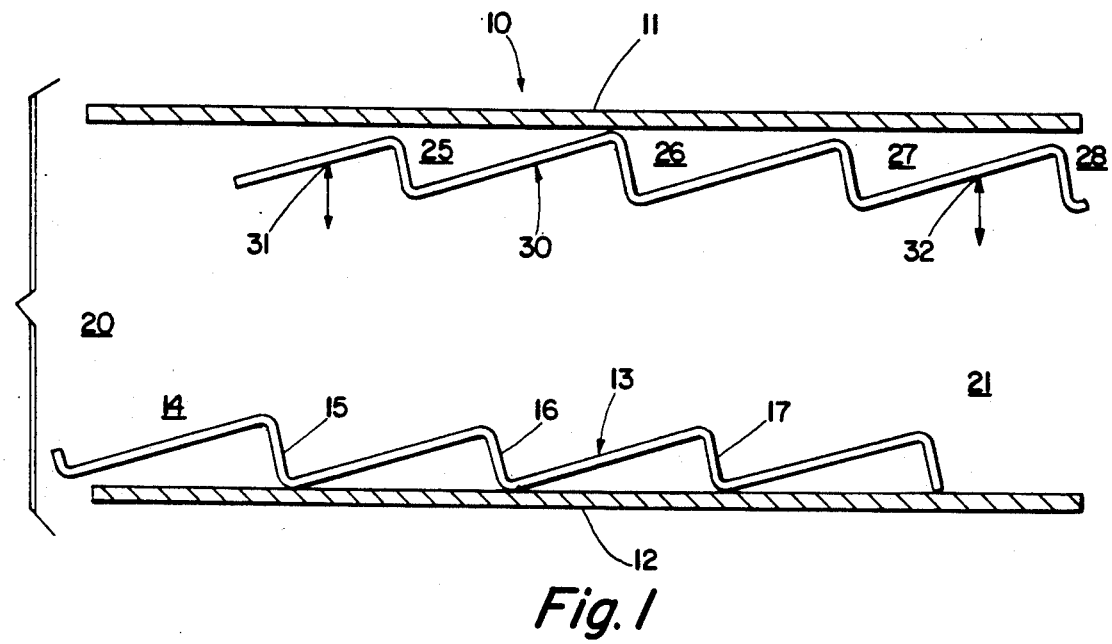
FIG. 1 shows, in schematic form, the adjustable brisket rail of the present invention and indicates the operating points at which it is moveable.

Referring now to the schematic drawing of FIG. 1, a milking parlor 10 is shown as having a first wall 11 and a second rear wall 12.

Two herringbone or S-shaped structures are shown in FIG. 1 and indicated generally at numerals 13 and 30.

The S-shaped structure 13 is fixedly attached to rear wall 12 and serves the purpose of positioning the rear end of cows when they are in the milking position.

In the arrangement shown, a first cow would have its rear end at region 14 and its head in region 25. A second cow would have its rear end at region 15 and its head in region 26. A third cow would have its rear end at position 16 and its head in region 27. A fourth cow would have its rear end at region 17 and its head at region 28.

It is important to note that, while a four-cow herringbone parlor is shown, the principles described herein have applicability to herringbone and parrel parlors used for any number of milking cow positions. It is also important to note that feeding in the parlor is an option of the brisket rail useage.

In the FIG. 1 drawing, cows enter from the left in the area of numeral 20 where a closure gate is positioned for use during the milking process. Cows exit to the right in the area of numeral 21 where a second closure gate is positioned for use during the milking process.

The S-shaped structure 30 is known in the art as a brisket rail and the adjustable feature of such rail 30 is deemed a key element of the present invention. It should also be noted that the brisket rail 30, which is shown in an S-shape, may be straight or otherwise configured to provide for an equal surface and function.

As previously referred to, the brisket rail 30 serves to restrain the cows in the desired milking position at regions 25, 26, 27 and 28 in cooperation with rear restraining areas 14, 15, 16 and 17. The brisket rail 30 also serves to form the funnel-shape for rapid ingress and funnel-shape for rapid egress. Furthermore, by closing the funnel during egress, the brisket rail pushes cows clear of milking positions.

In accordance with the present invention, the brisket rail 30 is adjustable at or near its left end at point 31. The rail 30 is further adjustable at or near its right end at a point 32. Such dual adjustment feature is indicated by the arrows in the regions of points 31 and 32 respectively.

It is contemplated that the adjustment of ends 31 and 32 be achieved via hydraulically pivoted arms as are used generally in the mechanical arts. Other equivalent motion systems may also be utilized and are intended to be covered as falling within the spirit and scope of the invention.

Figure 2:
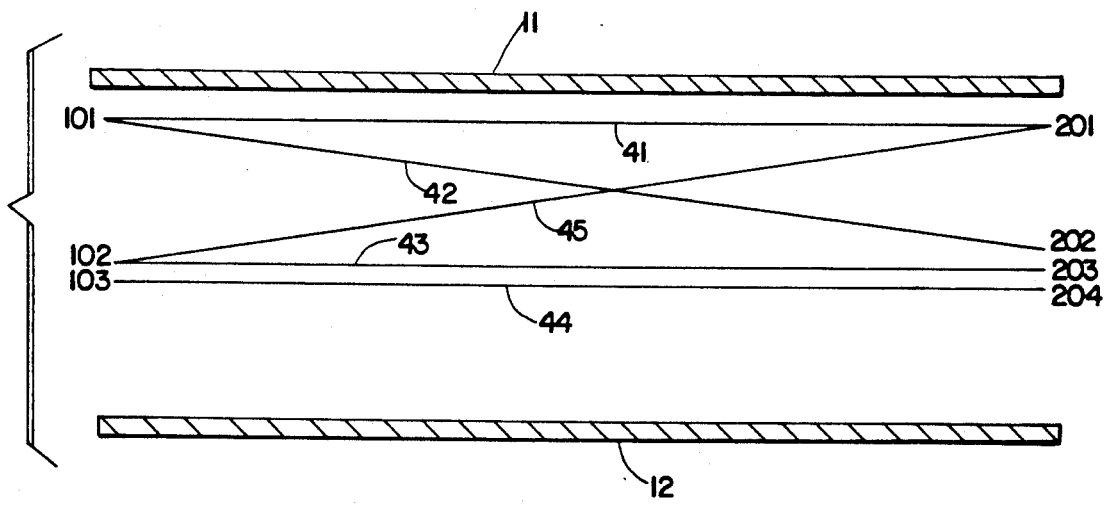
FIG. 2 illustrates the various positions of the brisket rail usage and indicates the novel method steps of the invention.

In accord with the method steps of the invention, the left pivot area 31 may assume three different positions as indicated by numerals 101, 102 and 103 in FIG. 2.

As further shown in FIG. 2, the right pivot area 32 may assume four different positions as indicated by numerals 201, 202, 203 and 204.

The five brisket rail positions are indicated by numerals 41, 42, 43, 44 and 45.

In practice of the invention, as cows enter from the left, the brisket rail 30 is in the position shown by line 42 in FIG. 2. Thus, a funneling effect is created whereby two or three cows may enter at region 20 and gradually funnel into single file to enter their respective milking positions. Such arrangement has been found to promote the rapid ingress of cows into the milking parlor.

Once the cows are in the parlor, the brisket rail 30 is adjusted to a closed position indicated by line 43 in FIG. 2. A further crowded or indexed position is indicated by line 44 in FIG. 2.

After the milking operation is completed, the brisket rail 30 is adjusted to the position of line 41 in FIG. 2 for rapid exit by the cows. Such is followed by movement to position 45, creating a reversed funnel-shape to facilitate cow exit. Closing the funnel to the brisket rail position 45 pushes cows egressing clear of milking position before returning to position 42 funnel entry.

From the foregoing description, it will be appreciated by those of skill in the dairy arts that a greatly improved milking parlor system and method are described which may be easily and economically installed into existing dairy barn operations.

The system disclosed provides a simple yet effective mechanical means by which the efficiency of the milking operation may be increased without the cumbersome components required in the prior art systems.

While there has been shown and described a preferred embodiment of the invention, various modifications may occur to those of skill in the art which fall within the intended spirit and scope of the invention. It is intended to cover all such equivalent modifications and uses within this application.

I claim:

1. A milking parlor system (10) having a first wall (11) and a second rear wall (12) parallel to said first wall,
    a herringbone structure (13) fixedly attached to said rear wall (12),
    said herringbone structure (13) having plural regions (14, 15, 16, 17) formed therein for receipt of the rear ends of cows to be milked,
    an adjustable brisket rail (30) positioned adjacent said first wall (11),
    wherein said adjustable brisket rail (30) has a moveable first or left end (31) and a moveable second or right end (32),
    wherein said first or left end (31) of said adjustable brisket rail (30) is positionable in at least two locations, said locations comprising a first position (101) relatively near said first wall (11) and a second position (102) relatively farther from said first wall (11),
    wherein said second or right end (32) of said adjustable brisket rail (30) is positionable in at least three locations; said at least three locations comprising a first position (201) relatively near said first wall (11), a second position (202) relatively farther from said first wall (11), and a third position (203) still farther from said first wall (11),
    wherein, upon entry from a left region (20), the first or left end (31) of the adjustable brisket rail (30) is positioned in said first position (101) and the second or right end (32) of the adjustable brisket rail (30) is positioned in said second position (202),
    wherein a funneling ingress shape (42) is created for entry into the milking parlor,
    wherein, to perform a milking operation, the first or left end (31) of the adjustable brisket rail (30) is positioned in said second position (102) and the second or right end (32) of the adjustable brisket rail (30) is positioned in said third position (203),
    wherein a closed shape (43) is created for the milking operation,
    wherein, upon egress from a right region (21), the first or left end (31) of the adjustable brisket rail (30) is positioned in said second position (102) and the second or right end (32) of said adjustable brisket rail (30) is positioned in said first position (201),
    wherein a reversed funneling exit shape (45) is created for rapid egress,
    wherein said first or left end (31) of said adjustable brisket rail (30) is further positionable in a third position (103),
    and wherein said second or right end (32) of said adjustable brisket rail (30) is further positionable in a fourth position (204),
    wherein a crowded shape (44) is created in the milking parlor when deemed desirable for the milking operation.

* * * * *